(12) United States Patent
Bick et al.

(10) Patent No.: US 7,843,872 B2
(45) Date of Patent: *Nov. 30, 2010

(54) METHODS AND ARRANGEMENTS TO DETERMINE A RECEPTION OF A SIGNAL

(75) Inventors: Eyal Bick, Ra'anana (IL); Uri Perlmutter, Holon (IL); Yuval Lomnitz, Herzelia (IL)

(73) Assignee: Intel Corporation, Santa Clara, CA (US)

(*) Notice: Subject to any disclaimer, the term of this patent is extended or adjusted under 35 U.S.C. 154(b) by 873 days.

This patent is subject to a terminal disclaimer.

(21) Appl. No.: 11/796,956

(22) Filed: Apr. 30, 2007

(65) Prior Publication Data

US 2008/0267059 A1    Oct. 30, 2008

(51) Int. Cl.
*H04W 4/00* (2009.01)

(52) U.S. Cl. .................. 370/328; 370/210; 370/203; 370/310

(58) Field of Classification Search .................. 370/328
See application file for complete search history.

(56) References Cited

U.S. PATENT DOCUMENTS

| 7,095,779 | B2 | 8/2006 | Karlsson |
| 7,606,139 | B2* | 10/2009 | Bick et al. .................. 370/210 |
| 2005/0265489 | A1* | 12/2005 | Chang et al. ................. 375/340 |
| 2006/0256885 | A1 | 11/2006 | Song |
| 2007/0149197 | A1* | 6/2007 | Lee et al. ..................... 455/436 |
| 2007/0217552 | A1* | 9/2007 | Lee et al. ..................... 375/343 |

OTHER PUBLICATIONS

USPTO application filed Dec. 6, 2006; U.S. Appl. No. 11/635,886; Preamble Detection Using Frequency Based Correlation; first named inventor Eyal Bick.

* cited by examiner

*Primary Examiner*—Patrick N Edouard
*Assistant Examiner*—Jalaleddin Amirmokri
(74) *Attorney, Agent, or Firm*—Schubert Law Group, PLLC; Neil K. Cohen

(57) ABSTRACT

Methods and arrangements for wireless communications are described. Embodiments include transformations, code, state machines or other logic to receive from a transmitter a signal representing a known sequence of symbols. The signal may be transmitted over a plurality of sub channels. The embodiments may also include determining channel responses at the sub channels and determining a reception of the known sequence. The determining may include treating the channel responses at the sub channels in a differential manner to cancel out channel phase responses and obtain channel amplitudes. In some embodiments, the cancelling may be performed by multiplying frequency domain values representing reception of a sub channel by the complex conjugate of frequency domain values of a neighboring sub channel. Many embodiments may also include calculating a carrier to interference and noise ratio (CINR) of the signal. In several embodiments, the signal may represent the preamble of a wireless frame.

10 Claims, 4 Drawing Sheets

METHODS AND ARRANGEMENTS TO DETERMINE A RECEPTION OF A SIGNAL

FIELD

The present invention is in the field of wireless communications. More particularly, embodiments are in the field of determining a reception of a signal representing a known sequence of symbols.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Generally speaking, methods and arrangements for wireless communications are contemplated. Embodiments include transformations, code, state machines or other logic to receive from a transmitter a signal representing a known sequence of symbols. The signal may consist of sub signals transmitted over a plurality of sub channels. The embodiments may also include determining channel responses at the sub channels and determining a reception of the known sequence. The determining may include treating the channel responses at the plurality of sub channels in a differential manner to cancel out channel phase responses and obtain channel amplitudes. In some embodiments, the cancelling may be performed by multiplying frequency domain values representing reception of a sub channel by the complex conjugate of frequency domain values of a neighboring sub channel. Many embodiments may also include calculating a carrier to interference and noise ratio (CINR) of the signal. In several embodiments, the signal may represent the preamble of a wireless frame. In further embodiments, the signal may identify a base station.

Figure 1:
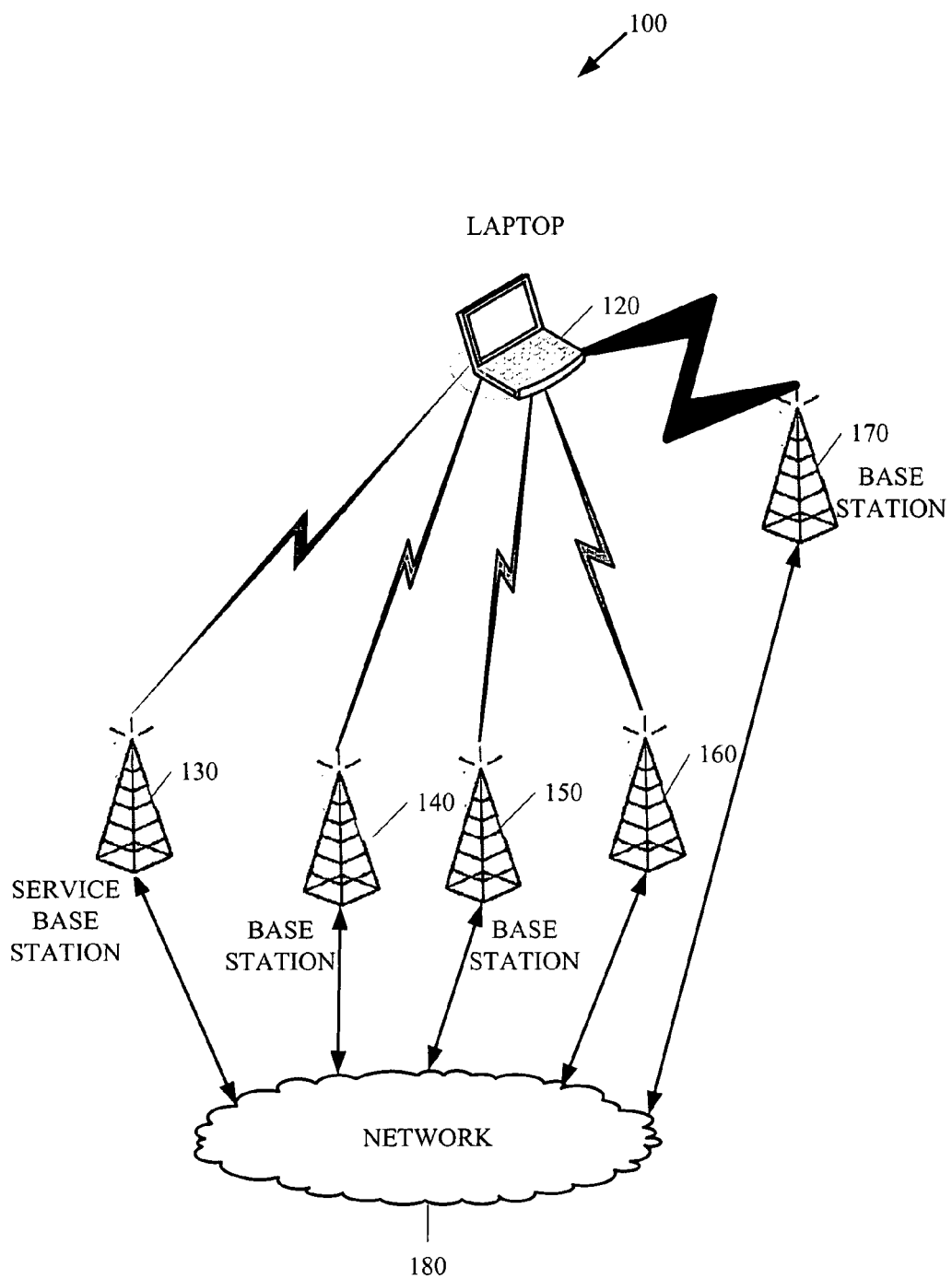
FIG. 1 is a diagram of an embodiment of a wireless network.

FIG. 1 is a diagram of an embodiment of a wireless network 100. The wireless network 100 includes laptop 120 and base stations 130, 140, 150, 160, and 170. Laptop 120 and base stations 130, 140, 150, 160, and 170 are connected by wireless connections. Base stations 130, 140, 150, 160, and 170 may be connected by network 180. Laptop 120 and base stations 130, 140, 150, 160, and 170 may transmit and receive messages by means of radio frequencies (RF). An RF transmitter may impress digital data onto a radio frequency for transmission of the data by electromagnetic radiation. The RF transmitter may, for instance, modulate a carrier wave. An RF receiver may receive electromagnetic energy at a radio frequency and extract the digital data. The RF receiver may, for example, demodulate the received radio waves.

Laptop 120 may communicate with other wireless devices not shown in FIG. 1 by relaying the communications through base station 130 (service base station). Laptop 120 may upload data to service base station 130 for transmission to the other wireless devices, and they may transmit data which arrives at service base station 130 and is downloaded by laptop 120.

In some embodiments, the communications between laptop 120, the base stations, and other wireless devices may be conducted according to the standards of IEEE 802.16 (WIMAX) (Worldwide Interoperability for Microwave Access). See IEEE Std 802.16-2004, published Oct. 1, 2004. WIMAX communications may utilize the orthogonal frequency division multiplexing (OFDM) transmission method. In orthogonal frequency division multiplexing (OFDM), the available frequency spectrum of the channel is subdivided into a large number of sub channels representing portions of the available frequency bandwidth. An information signal to be transmitted, such as a bit stream, is divided into portions, and the portions are sent simultaneously over the various sub channels. In some cases, 1024 channels may be utilized. A receiver, such as a receiver in laptop 120 or one of the base stations (130, 140, 150, 160, or 170) may receive the signals, separate them by frequency, decipher the signals for each frequency, and combine them again to produce the transmitted information. The sub bands may be selected so as not to interfere with each other.

Laptop 120 may switch to another base station as a service base station to obtain better communications, a process called handover. For example, movement of laptop 120 may decrease the strength of the signal from service base station 130 and increase the strength of the signal from one of the other base stations 140, 150, 160, and 170. FIG. 1 may illustrate the desirability of a handover. The arrows between laptop 120 and the base stations may represent the strength of the signals from the base stations. In the diagram of FIG. 1, the strength of the signal from base station 170 is significantly stronger than the strength of the signal from service base station 130.

Laptop 120 may determine the quality of reception of each of base station's 130, 140, 150, 160, and 170 signals in order to perform handover. This determination may be performed without knowledge of the wireless channel between each of the base stations 130, 140, 150, 160, or 170 and laptop 120. When communications between laptop 120 and the base stations 130, 140, 150, 160, or 170 follow the WiMAX standards or other standards in which the channel is subdivided into sub channels, the determination may be based upon a differential analysis of the responses of sub channels of the wireless channel. In addition, the determination may be carried out by receiving a signal representing a known sequence of symbols and determining the reception of the known sequence of symbols.

The wireless network 100 illustrated in FIG. 1 is for explanation, not for limitation. Systems for wireless communications useful according to various embodiments of the present invention may include additional wireless devices or may omit some of the wireless devices shown. Wireless devices included in a wireless network may include smart phones, pagers, e-mail appliances, special-purpose units for scanning, bar coding, and credit card reading, and other devices that may be known to those of skill in the art.

Other embodiments may communicate according to a variety of wireless protocols including NFC (Near Field Communications), WLAN (Wireless Local Area Network), WMAN (Wireless Metropolitan Area Network), WiMAX (Worldwide Interoperability for Microwave Access), 3.5-3G cellular, RAN (Radio Access Network), PAN (personal area network), 4G, RFID (Radio Frequency Identification), and other wireless protocols which may be known to those of skill in the art. IEEE standards 802.11a, 802.11b, 802.11g, or 802.11n may apply to WLAN networks. IEEE standard 802.16 may apply to WiMAX networks. Standard ECMA-368 may apply to PAN networks.

A variety of network architectures may be used in other embodiments. In some embodiments, a wireless device such as laptop 120 may be connected to multiple base stations as service base stations. In many embodiments, a wireless device may select a service base station with each frame. In several embodiments, a wireless device such as laptop 120 may associate with an access point and relay communications to other wireless devices through the access point. In a few embodiments, the base stations may not be connected with a network such as network 180.

Figure 2:
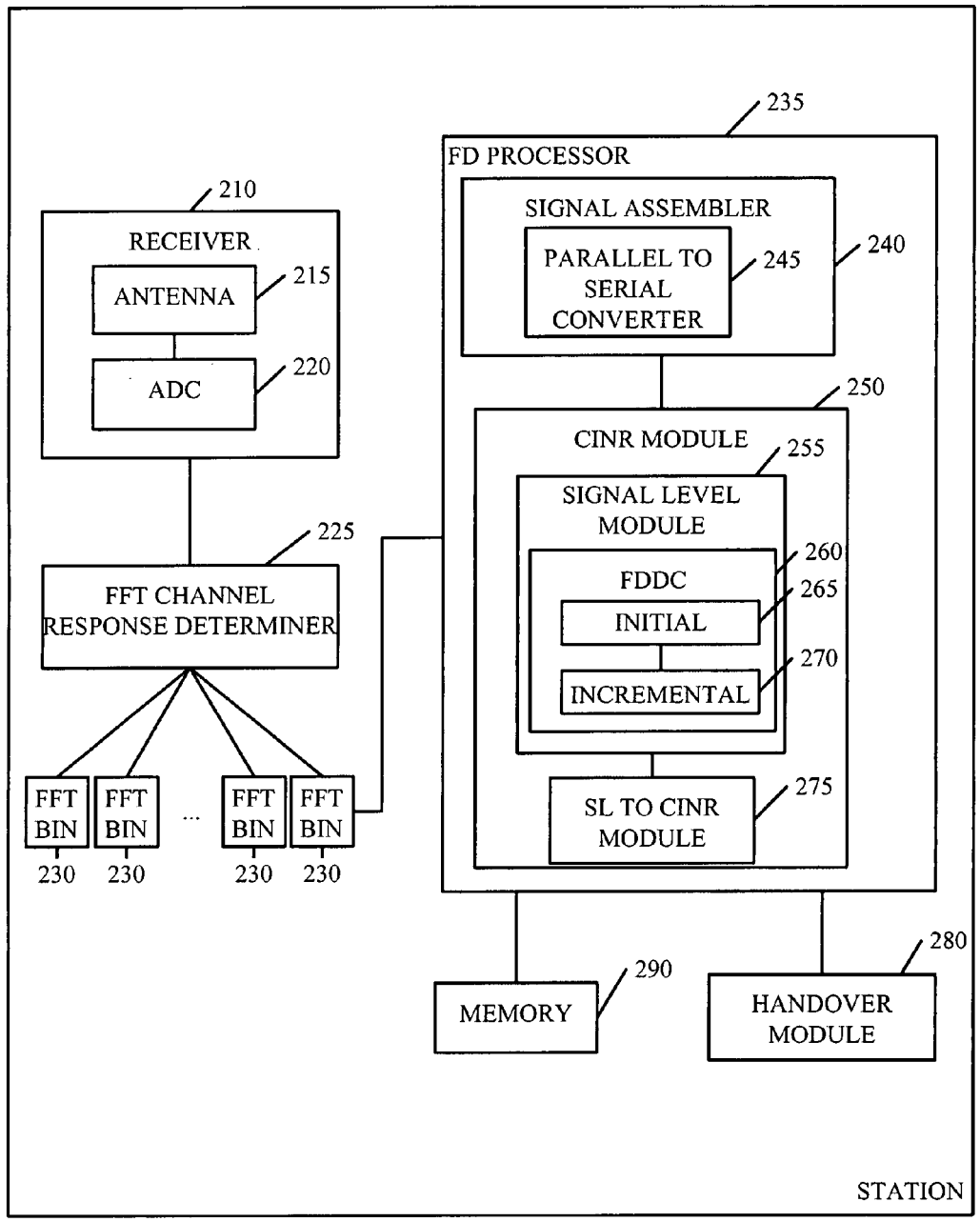
FIG. 2 is a diagram of an embodiment of an apparatus to determine the reception of a signal.

Turning to FIG. 2, shown is a diagram of an embodiment of an apparatus to determine the reception of a signal. Station 200 includes receiver 210, FFT channel response determiner 225, FFT bins such as FFT bins 230, frequency domain (FD) processor 235, handover module 280, and memory 290. Receiver 210 may receive wireless signals and process them. Receiver 210 may take in the transmitted signal from the channel and process it to retrieve the information signal. Receiver 210 may attempt to discriminate the signal from other signals which may use the same channel, amplify the signal for processing, and demodulate or remove the carrier from the processed signal to retrieve the information that was sent.

Receiver 210 includes antenna 215 and analog to digital converter (ADC) 220. ADC 220 may convert the RF waves of the signal to digital forms. ADC 220 may measure the electrical signals produced by the signal at a predetermined frequency, divide the amplitudes of the waves into ranges, and record the ranges. FFT channel response determiner 225 may convert the digitalized signal into a series of values of the signal at various frequencies by performing a Fourier transformation. The values may consist of complex numbers which represent the amplitude and channel response of the sub channels over which the signal is transmitted. In many embodiments, FFT channel response determiner 225 may utilize an efficient version of the Fourier transformation, a fast Fourier transformation (FFT). The values of the signal at the various frequencies may be stored in the FFT bins 230. In some embodiments, each FFT bin 230 may store the value of the response of a specific sub carrier frequency. For example, in an OFDM transmission system which divides the carrier into 1024 sub carriers, there may be 1024 FFT bins. The values of the various frequencies may comprise a parallel stream representing the signals of the sub carriers of the original signal. The FFT bins 230 may be implemented in volatile or non-volatile memory. The memory may include random access memory and non-volatile memory such as a hard disk drive, optical disk drive, electrically erasable programmable read-only memory space (EEPROM or Flash memory) drives, or as any other kind of memory as will occur to those of skill in the art.

Frequency domain (FD) processor 235 may process the values of the signal at the various frequencies. FD processor 235 includes signal assembler 240 and CINR module 250. Signal assembler 240 may combine the parallel stream output represented by the contents of the FFT bins 230 into a serial signal. CINR module 250 may calculate the CINR of the signal received by receiver 210. CINR module includes signal level module 255 and SL (signal level) to CINR module 275. Signal level module 255 may determine the reception of a known sequence of symbols represented by a signal received by receiver 210. For example, signal level module 255 may determine the reception of a known preamble from a base station. Signal level module 255 includes FDDC (frequency domain differential correlator) module 260. FDDC module 260 may determine the reception of a known sequence of symbols by treating the channel responses at the plurality of sub channels in a differential manner to cancel out channel phase responses and obtain channel amplitudes. FDDC module 260 includes initial calculation module 265 and incremental calculation module 270.

In further embodiments, there may be a constant difference or step size in FFT bins 230 between consecutive bits of a known base station preamble. A constant offset in sub carrier frequencies used to transmit the consecutive preamble bits may produce the constant difference in FFT bins. For example, the difference in FFT bins between consecutive bits of a preamble transmitted according to the WiMAX standard is 3. In WiMAX, neighboring base stations are assigned different preambles for identification, selected out of a given set of 114 symbols. A preamble symbol is transmitted as the first OFDM symbol of a frame.

For transmissions in which there may be a constant difference or step size in the FFT bins 230 between consecutive preamble bits, signal level module 255 may apply formula (1) below to determine the reception of a preamble sequence by a differential treatment:

$$FDDC(x) = \sum_{k=0}^{Plen-2} FftOut(Y_0 + StepSize \times k) \times \\ conj\{FftOut(Y_0 + StepSize \times (k+1))\} \times DP(x, k) \quad (1)$$

where:
FDDC (x) is the frequency domain differential correlator of sequence x,
StepSize is the constant difference in FFT bins between consecutive bits of sequence x,
Plen is the length of sequence x in bits,
FftOut(y) is the complex value of bin y of the FT bins, given by the formula:

$FftOut(Y_0+StepSize \times k)=P(x,k) \times H(Y_0+StepSize \times k)$ $Y_0$ is the bin to which the first bit of sequence x is transmitted,
Conj is the complex conjugate, $conj(re^{i\theta})=(re^{-i\theta})$,
DP(x,k) is bit k of sequence x in differential form, +1 if the bit is the same as the previous bit and −1 if the bit is the opposite of the previous bit,
H(y) is the channel response at FFT bin y, and
P(x, k) is the kth bit of sequence x.

In channels with large coherence bandwidth relative to a preamble's StepSize, FDDC (x) may be a suitable measure of the channel amplitude response for reception of the preamble. The frequency response of these channels may slowly change for sub carriers of nearby frequencies. Under these conditions, multiplying an FFT value by the complex conjugate of a neighboring FFT value may cancel the unknown phase value, leaving only the channel amplitude response. Consequently, FDDC (x) may determine the channel amplitude response, as shown by the following derivation:

$$FDDC(x) = $$

$$\sum_{k=0}^{Plen-2} P(x, k) \times H(Y_0 + StepSize \times k) \times$$

$$conj\{P(x, k+1) \times H(Y_0 + StepSize \times (k+1)))\} \times$$

$$P(x, k) \times P(x, k+1) = \qquad \text{(step 1)}$$

$$\sum_{k=0}^{Plen-2} H(Y_0 + StepSize \times k) \times \qquad \text{(step 2)}$$

$$conj\{H(Y_0 + StepSize \times (k+1))\} \cong$$

$$\sum_{k=0}^{Plen-2} |H(Y_0 + StepSize \times k)|^2 \cong \qquad \text{(step 3)}$$

$$\frac{1}{StepSize} \sum_{n=0}^{FFT-1} |H(n)|^2 \qquad \text{(step 4)}$$

Step 1 follows from formula (1) by substituting the definition of FftOut for the function. Step 2 follows from step 1 because the P(x, k) are +/−1. In step 3, the symbol |z|, where $z = re^{i\Theta}$, represents the absolute value of z and is equal to r. Step 3 follows from step 2 when neighboring values of H are approximately equal. In that case, $$H(Y_0 + StepSize \times k)) \times conj\{H(Y_0 + StepSize \times (k+1)))\} \cong H(Y_0 + StepSize \times k)) \times conj\{H(Y_0 + StepSize \times k))\} = |H(Y_0 + StepSize \times k)|^2 \qquad \text{(step 5)}$$

Step 5 follows because the product of a complex number representing a channel response and its conjugate is the square of the magnitude of the complex number. Multiplying the complex number by its complex conjugate cancels out the phase value, leaving only the square of the channel amplitude response. In mathematical terms, let $z = re^{i\Theta}$, where r represents the channel amplitude response and $\Theta$ represents the phase response. Then $z \times conj(z) = re^{i\Theta} \times re^{-i\Theta} = r \times r = r^2$, which is the square of the channel amplitude response.

Step 4 is obtained by replacing individual values of FFT bins with the average of values of nearby FFT bins. For example, when StepSize is 3, $|H(0)|^2$ may be replaced by $\frac{1}{3}(|H(0)|^2 + |H(1)|^2 + |H(2)|^2)$ The expression of step 4 is the summation of the square of channel responses, which is equal to the power of the signal and therefore the reception. Thus, in channels with large coherence bandwidth relative to a preamble's StepSize, FDDC (x) may be a suitable measure of the channel amplitude response for reception of the preamble. Because the preamble symbol may be transmitted with a known, constant power, the signal level may also be determined.

Initial calculation module 265 and incremental calculation module 270 may efficiently apply formula (1) to determine the reception of preambles from multiple base stations, such as for determining whether to perform a handover. Initial calculation module 265 may perform the complex multiplications from formula (1) and store the resulting factors in memory. The complex multiplications are products of the form:

$$f_k = H(Y_0 + StepSize \times k)) \times conj\{H(Y_0 + StepSize \times (k+1)))\} \qquad (2)$$

where the multiplications are done once for each possible preamble symbol and stored in memory 290.

Incremental calculation module 270 may calculate the reception of the preambles by multiplying the factors $f_k$ of formula (2) by + or − signs determined from the preamble sequences. For example, incremental calculation module 270 may calculate the reception by applying the formula:

$$FDDC(x) = \sum_i f_i \times P(x, k) \times P(x, k+1) \times DP(x, k) \qquad (3)$$

where the P and DP are defined as in formula (1) and have value either +1 or −1.

For preambles which satisfy the requirements of formula (1), application of formula (3) may calculate the reception more efficiently than common methods. The complexity of the incremental algorithm expressed by formula (3) may be lower than the complexity of the common methods. A common method to estimate CINR is to perform a match filter to the known preamble signal and divide the result by the total power. However, the match filter is a complex and expensive operation in the time domain. If a match filter is repeated several times for each preamble for each base station, the complexity is multiplied by the number of preambles. In particular, estimating CINR by the match filter method may require far more complex multiplications than calculating CINR by the incremental algorithm of formula (3). A complex multiplication is an especially time-consuming operating, made up of four simple multiplications.

A match filter may be implemented in an OFDM system in the frequency domain by multiplying the received signal (FFT out) with the preamble sequences (±1) and returning to time domain using inverse FFT (IFFT). Thus, this method requires one IFFT operation per preamble per base station. Each IFFT requires N log N complex multiplications, where N is the FFT size. For M base stations, the match filter method requires M'N×log N complex multiplications.

In contrast, the FDDC based CINR calculation of formula (3) is independent of the number of base stations. The method requires only a fixed amount of complex multiplications (Plen-1) initially. Multiple preambles from multiple base stations only add ± operations. Therefore, the calculation of the CINR of several base stations at once may be executed efficiently. The FDDC method with the match filter method requires on the order of N/3 complex multiplications, where 3 is the StepSize, the distance in FFT bins between two consecutive preamble bits. This value is not related to the number of base stations.

SL to CINR module 275 may determine the CINR of the preamble reception based upon the output from the signal level module 255. CINR is carrier divided by interference and noise. SL to CINR module 275 may determine CINR by applying the following formula:

$$CINR = \frac{FDDC}{TotalPoer - FDDC} \qquad (4)$$

where FDDC is the reception of a known sequence and TotalPowr is the total power of the signal. In other words, CINR is FDDC divided by total power less FDDC. Total power less FDDC is interference and noise level. TotalPowr may be calculated by the applying the formula:

$$TotalPower = \sum_{n=0}^{FFT-1} |Y(n)|^2 \qquad (5)$$

where the Y (i) are the values in the FFT bins.

Handover module 280 may determine whether to perform a handover and may choose a successor base station in a handover. Handover module 280 may base the selection of a successor base station upon the CINRs of the base stations neighboring station 200, and may selecting the base station with the highest CINR as a successor base station.

Figure 3:
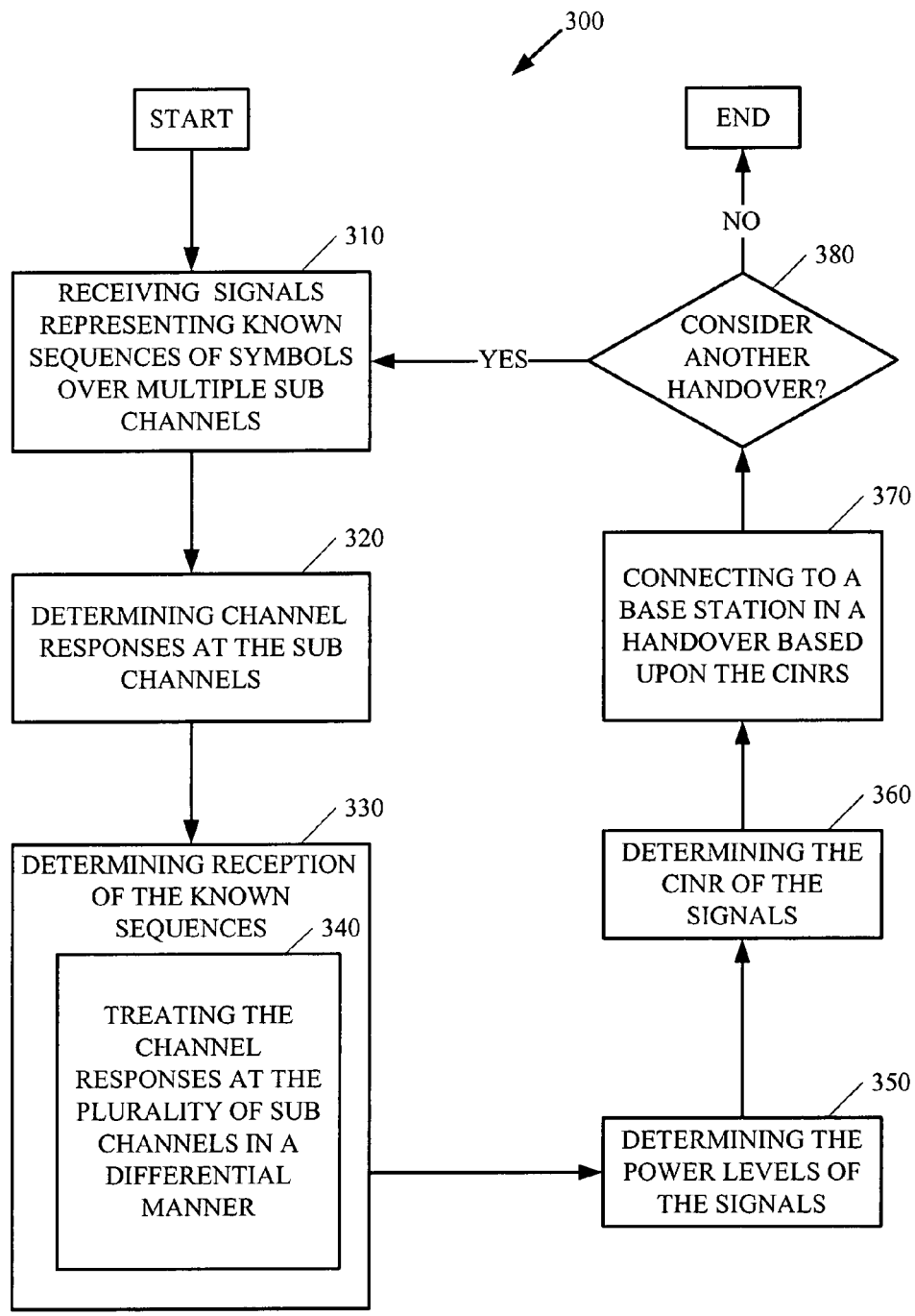
FIG. 3 is a flowchart of an embodiment of a method to determine a reception of a signal representing a known sequence of signals.

FIG. 3 depicts a flowchart 300 of an embodiment of a method to determine a reception of a signal representing a known sequence of signals. The method may be carried out by an apparatus such as station 200 depicted in FIG. 2. The method includes receiving signals representing known sequences of symbols over multiple sub channels (element 310). The signals may comprise the preambles of base stations neighboring a station, which may be transmitted by an OFDM method such as WiMAX. The sub channels may comprise the sub channels used in the OFDM transmission method.

The method also includes determining the channel responses at the sub channels (element 320). The channel responses may be determined by receiving the signals and applying a Fourier transformation to convert the signals to the frequency domain. The Fourier transformation is typically a fast Fourier transformation. The result is a series of values of signals at a series of frequencies. These values may be stored in memory such as FFT bins 230 in FIG. 2.

The method includes determining reception of the known sequences (element 330). The reception may be determined by treating the channel responses at the plurality of sub channels in a differential manner to cancel out phase responses add obtain channel amplitudes (element 340). Treating the channels in a differential manner may be done by comparing the responses at nearby sub channels. The response may slowly change in frequency so that nearby sub channels have similar phase responses, which may be cancelled. For suitable signals, treating the channels in a differential manner may be carried out by applying formula (1). These signals may have a constant different in FFT bins between consecutive bits of the sequence. In addition, these signals may be represented by +/−1.

The method of flowchart 300 includes determining the power levels of the signals (element 350). The power levels may be determined by applying formula (5). The method also includes determining the CINR of the signals (element 360). The CINR may be calculated by dividing the reception by the interference and noise level as in formula (4).

The CINRs may be used to determine a successor service base station in a handover (element 370). A station may determine the CINRs of neighboring base stations, and may connect to one with the highest CINR. If reception changes, such as from the station moving, the station may consider another handover (element 380). If so, the elements of FIG. 3 from 310 to 370 may be repeated. Otherwise, the method of FIG. 3 may end.

Figure 4:
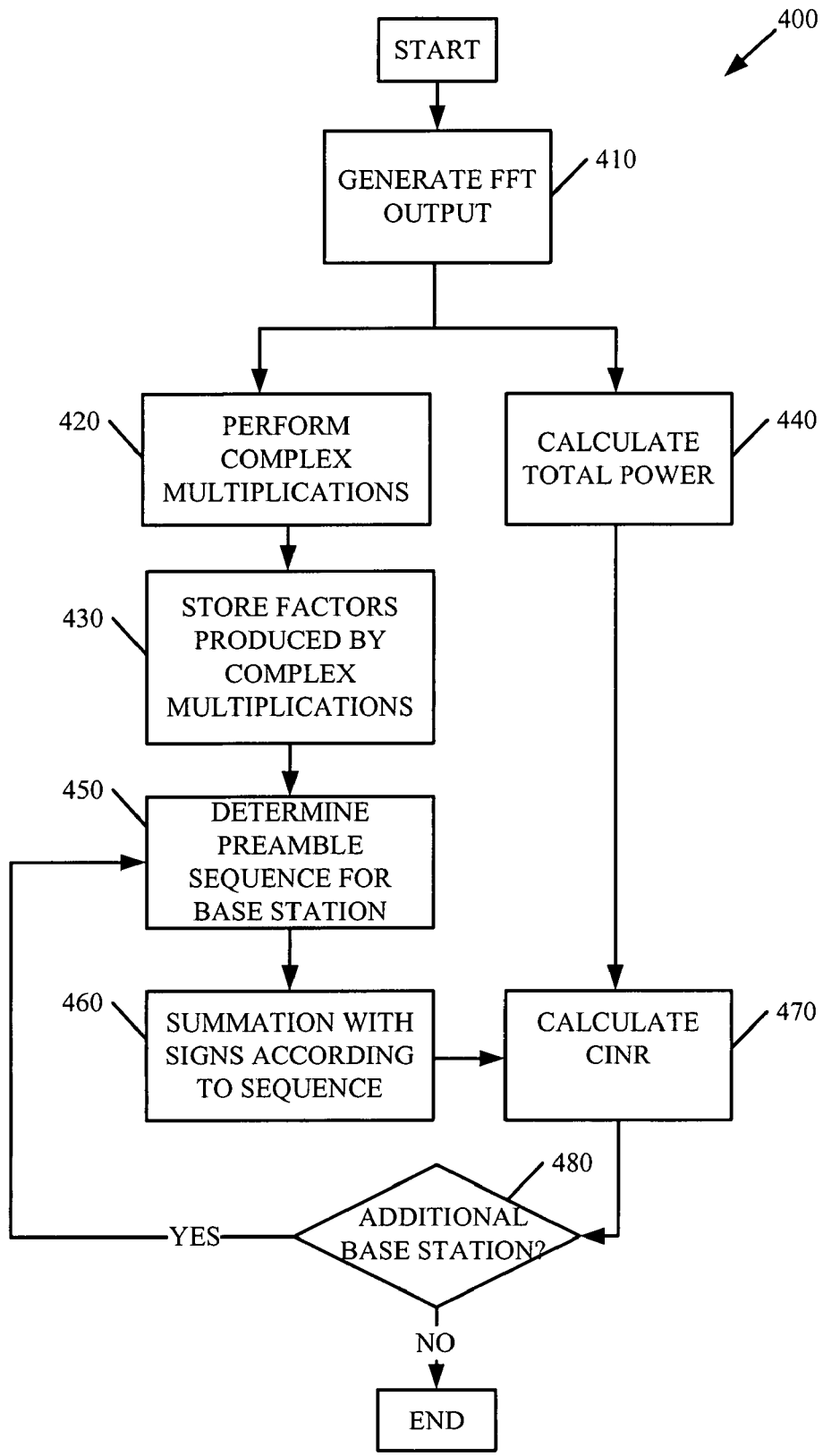
FIG. 4 is a flow chart of an embodiment of an iterative method to determine carrier to interference and noise ratios of signals.

When the reception of and CINRs of multiple signals are determined simultaneously, iterative methods may prove efficient. Turning to FIG. 4, depicted is a flow chart 400 of an embodiment of an iterative method to determine CINRs of signals. The method may determine the reception according to formula (1) and the CINR from the reception and the total power according to formula (4). The method may consist of two phases. The initial phase, performed once, may include elements 410, 420, 430, and 440. The initial stage may be performed by a module such as initial module 265 of FIG. 2. The remaining elements (450, 460, 470, and 480) of the method of FIG. 4 may be performed once for each base station. These elements may be performed by a module such as incremental module 270 of station 200 in FIG. 2. The method of FIG. 4 includes generating the FFT output of the signals (element 410), resulting in values of FFT bins. The method includes performing complex multiplications (element 420) and storing the factors produced by the complex multiplications (element 430). The factors may be based upon formula (1) and may be obtained from formula (2). The method also includes calculating the total power of the signals (element 440), which may be done by applying formula (5).

The method includes determining a preamble sequence for a base station (element 450). When the preamble has a simple representation, the preamble sequence may consist of +/−1. The preamble sequence may be calculated from the bits representing the preamble by $$B_i = P(x,k) \times P(x,k+1) \times DP(x,k) \qquad (6)$$

where P(x, k) and DP(x, k) are defined as in formula (1).

The method includes a summation with signs according to preamble sequence (element 460). This summation may be performed by applying formula (3). The result is the calculation of FDDC. CINR may then be calculated (element 470). If there are additional base stations (element 480), the reception and CINR of signals from the additional base stations may be determined by repeating elements 450 through 470. Otherwise, the method of FIG. 4 may end.

The elements of FIG. 3 and FIG. 4 are for illustration and not limitation. In some embodiments, reception of a signal may be determined without determining CINR of the signal. In some embodiments, the determination of CINRs may not result in a handover. In many embodiments, some of the elements may be omitted or others added, or the elements may be performed in a different order.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc., including wireless access mechanisms. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

It will be apparent to those skilled in the art having the benefit of this disclosure that the present invention contemplates methods and arrangements for determining a reception of a signal representing a known sequence of symbols, the symbols transmitted over multiple sub channels, by treating the channel responses of the sub channels in a differential manner. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of wireless communications, the method comprising:

receiving from a transmitter a signal representing a known sequence of symbols, the signal comprising a plurality of sub signals transmitted over a plurality of sub channels;

determining channel responses at the plurality of sub channels; and determining a reception of the known sequence, the determining comprising treating the channel responses at the plurality of sub channels in a differential manner to cancel out channel phase responses and obtain channel amplitudes, wherein determining a reception comprises applying the formula:

$$FDDC(x) = \sum_{k=0}^{Plen-2} FftOut(Y_0 + StepSize \times k) \times conj\{FftOut(Y_0 + StepSize \times (k+1))\} \times DP(x, k)$$

where:
FDDC (x) is a measure of the reception of sequence x,
a Fourier transformation has been applied to the signal representing x to produce Fourier transformation bins (FT bins), and there is a constant difference in FT bins between consecutive bits of x,
StepSize is the constant difference in FFT bins between consecutive bits of sequence x,
Plen is the length of sequence x in bits,
FftOut(y) is the complex value of bin y of the FT bins, given by the formula:

$FftOut(Y_0+StepSize \times k)=P(x,k) \times H(Y_0+StepSize \times k)$ $Y_0$ is the bin to which the first bit of sequence x is transmitted,
DP(x,k) is bit k of sequence x in differential form,
H(y) is the channel response at FT bin y, and
P(x,k) is the kth bit of sequence x.

2. The method of claim 1, further comprising determining a carrier to interference and noise ratio (CINR) of the signal, the determining comprising applying the formula:

$$CINR = \frac{FDDC}{TotalPowr - FDDC}$$

where TotalPowr is the total power of the signal.

3. The method of claim 2, wherein:
the receiving from a transmitter comprises receiving from a base station; and
the method further comprises connecting to the base station in a handover, the connecting based upon the CINR of the signal.

4. The method of claim 1, wherein:
applying the formula comprises calculating and storing a plurality of factors $f_i$; and the method further comprises:
receiving from another transmitter another signal representing another known sequence of symbols; and
determining a reception of the other known sequence by applying the formula:

$$FDDC(x) = \sum_i f_i A_i$$

where:

FDDC (x) is a measure of the reception of sequence x,
x is a known sequence, and
the $A_i$ are +/−1 and based upon the elements of the known sequence x.

5. The method of claim 1, wherein the receiving comprises receiving a known preamble of a wireless frame.

6. An apparatus for wireless communications, the apparatus comprising:
a receiver to receive from a transmitter a signal representing a known sequence of symbols, the signal comprising a plurality of sub signals transmitted over a plurality of sub channels and to determine channel responses at the plurality of sub channels; and
an FDDC module to determine a reception of the known sequence, the determination to comprise treating the channel responses at the plurality of sub channels in a differential manner to cancel out channel phase responses and obtain channel amplitudes, the determination to comprise applying the formula:

$$FDDC(x) = \sum_{k=0}^{Plen-2} FftOut(Y_0 + StepSize \times k) \times conj\{FftOut(Y_0 + StepSize \times (k+1))\} \times DP(x,k)$$

where:
FDDC (x) is a measure of the reception of sequence x,
a Fourier transformation has been applied to the signal representing x to produce Fourier transformation bins (FT bins), and there is a constant difference in FT bins between consecutive bits of x,
StepSize is the constant difference in FFT bins between consecutive bits of sequence x,
Plen is the length of sequence x in bits,
FftOut(y) is the complex value of bin y of the FT bins, given by the formula:

$FftOut(Y_0+StepSize \times k)=P(x,k) \times H(Y_0+StepSize \times k)$ $Y_0$ is the bin to which the first bit of sequence x is transmitted,
DP(x,k) is bit k of sequence x in differential form,
H(y) is the channel response at FT bin y, and
P(x,k) is the kth bit of sequence x.

7. The apparatus of claim 6, further comprising a CINR module to determine a carrier to interference and noise ratio (CINR) of the signal, the determination comprising applying the formula:

$$CINR = \frac{FDDC}{TotalPowr - FDDC}$$

where TotalPowr is the total power of the signal.

8. The apparatus of claim 6, wherein:
the receiver is to receive from another transmitter another signal representing another known sequence of symbols; and
the submodule further comprises an iterative submodule to calculate and store a plurality of factors $f_i$ and to determine a reception of the other known sequence by applying the formula:

$$FDDC(x) = \sum_i f_i A_i$$

where:
FDDC (x) is a measure of the reception of sequence x,
x is a known sequence, and
the $A_i$ are +/−1 and based upon the elements of the known sequence x.

9. The apparatus of claim 6, wherein:
the receiver is to receive the known signal from a base station; and
the apparatus further comprises a handover module to connect to the base station in a handover, the connection based upon the CINR of the known signal.

10. The apparatus of claim 6, wherein the receiver is to receive a known preamble of a wireless frame.

* * * * *